(12) United States Patent
Martin et al.

(10) Patent No.: US 10,935,076 B2
(45) Date of Patent: Mar. 2, 2021

(54) JOURNAL BEARING ASSEMBLY WITH DUAL OIL CAVITIES

(71) Applicant: PRATT & WHITNEY CANADA CORP., Longueuil (CA)

(72) Inventors: Bruno Martin, Saint-Jean-sur-Richelieu (CA); Louis Brillon, Varennes (CA); Julien Simard-Bergeron, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/403,002

(22) Filed: May 3, 2019

(65) Prior Publication Data
US 2020/0347882 A1    Nov. 5, 2020

(51) Int. Cl.
*F16C 33/10*    (2006.01)
*F16H 57/04*    (2010.01)
*F16C 17/12*    (2006.01)

(52) U.S. Cl.
CPC .......... *F16C 33/1055* (2013.01); *F16C 17/12* (2013.01); *F16H 57/043* (2013.01)

(58) Field of Classification Search
CPC ...... F16C 17/02; F16C 17/12; F16C 33/1025; F16C 33/1045; F16C 33/1055; F16C 33/106; F16C 33/1065; F16C 2361/65; F16H 57/043; F16H 57/0434; F16H 57/0469; F16H 57/0471
See application file for complete search history.

(56) References Cited

U.S. PATENT DOCUMENTS

| 985,460 | A | * | 2/1911 | Schroder | B61F 15/06 384/162 |
| 3,806,210 | A | * | 4/1974 | Deleu | F16C 33/1065 384/406 |
| 4,514,099 | A | * | 4/1985 | John | F16C 17/02 384/100 |
| 8,591,371 | B2 | * | 11/2013 | Dinter | F03D 80/70 475/160 |
| 8,894,529 | B2 | | 11/2014 | McCune | |
| 10,119,417 | B2 | | 11/2018 | Bucking | |
| 2016/0326902 | A1 | | 11/2016 | McCune et al. | |
| 2018/0051797 | A1 | * | 2/2018 | Klein-Hitpass | F16H 1/2836 |

* cited by examiner

Primary Examiner — James Pilkington
(74) Attorney, Agent, or Firm — Norton Rose Fulbright Canada LLP

(57) ABSTRACT

A gas turbine engine comprising a gearbox, the gearbox having gear(s). A journal bearing assembly rotatably supports the gear, the journal bearing assembly having at least a pin, and a journal having a tubular body defining a pin-receiving inner cavity having an inner surface, a first cavity and a second cavity defined in the inner surface of the pin-receiving inner cavity, a rib support located between the first cavity and the second cavity, the rib support being aligned with a longitudinal center of the tubular body, with the first cavity and the second cavity on opposed axial sides of the rib support.

18 Claims, 4 Drawing Sheets

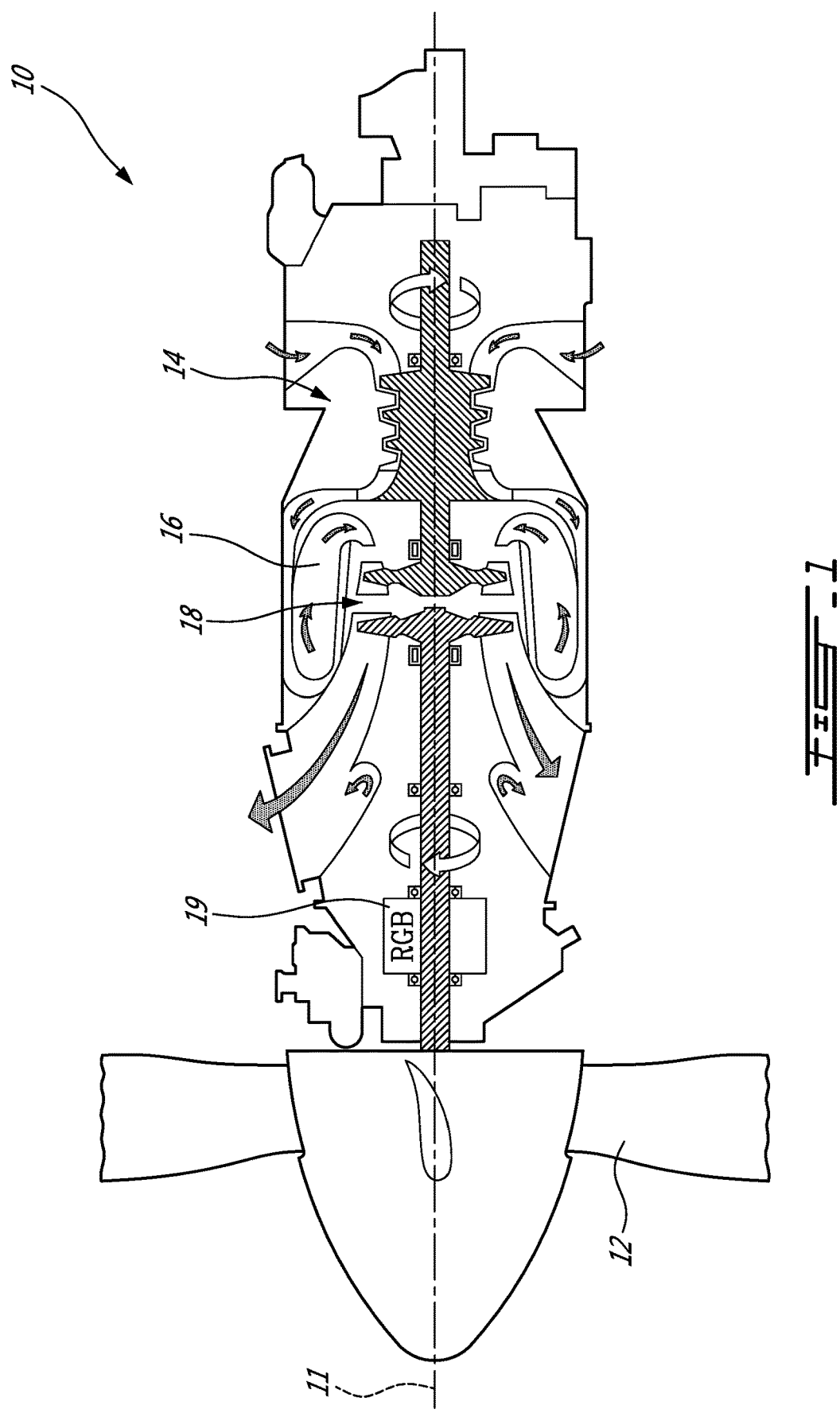

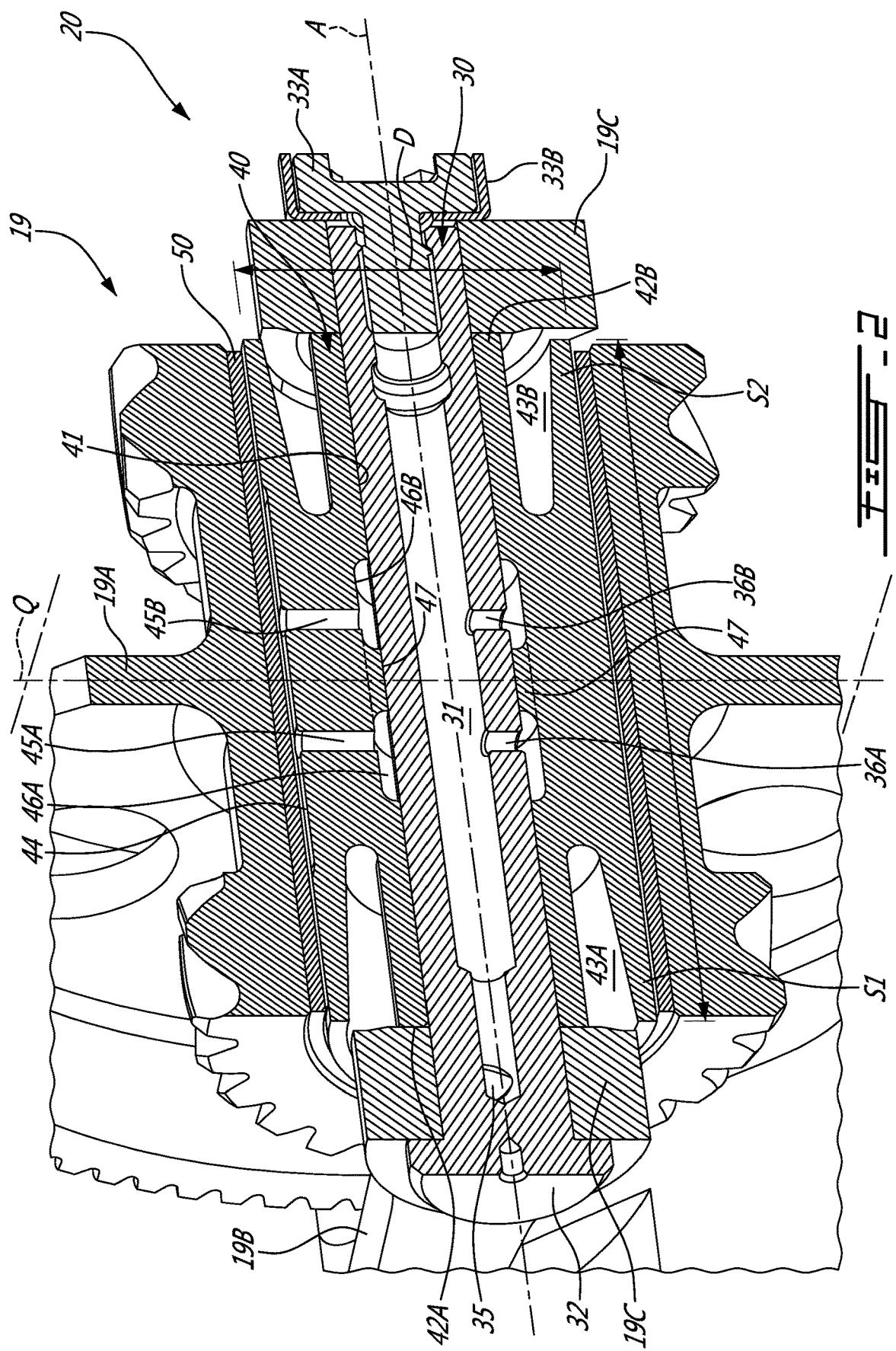

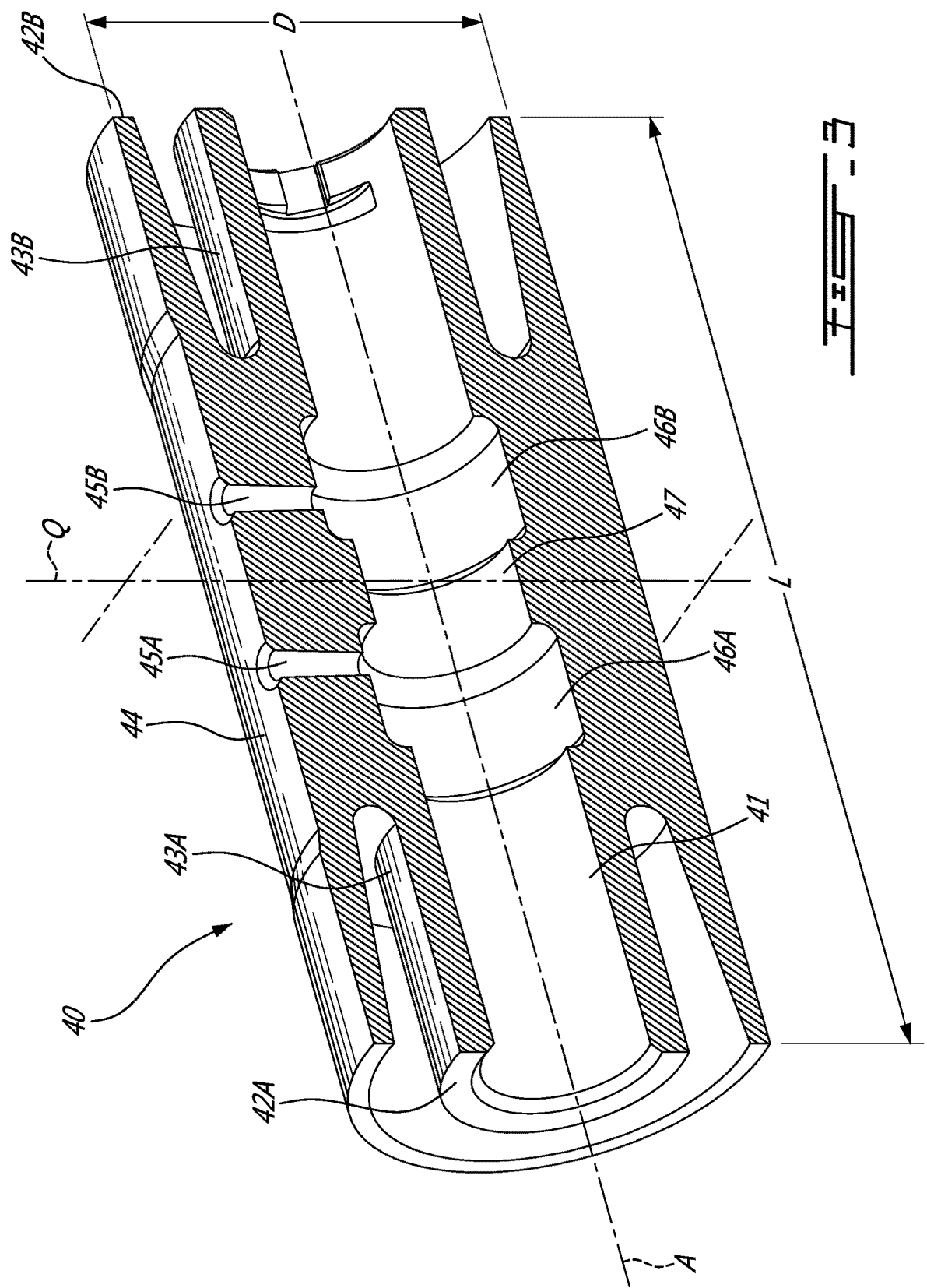

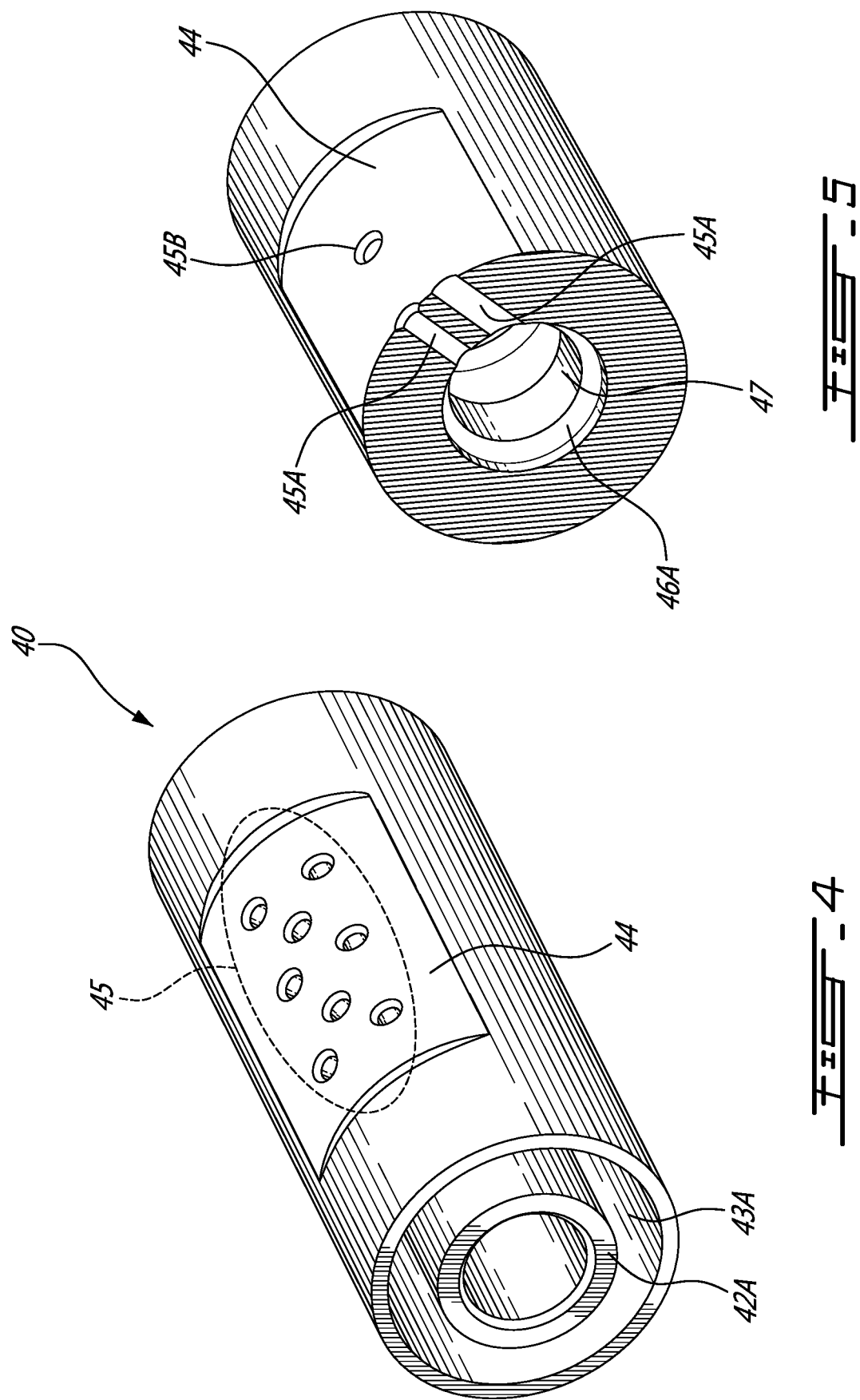

US 10,935,076 B2

JOURNAL BEARING ASSEMBLY WITH DUAL OIL CAVITIES

TECHNICAL FIELD

The present invention relates generally to mounting devices for rotating assemblies of gas turbine engines, and more particularly to journal bearings for such engines.

BACKGROUND

Turbine engines typically includes a number of rotating components or parts mounted together via mounting devices providing suitable support and allowing axial and/or rotational movement between such components. Those mounting devices may be journal bearings. Journal bearings may define oil cavities to feed lubricating oil to an interface between a journal surface and a part rotating on the journal surface. However, such oil cavities may cause an increase in compliance of the journal bearing which may in turn lead to undesirable pressure variations along the length of the journal bearing.

SUMMARY

In one aspect, there is provided a gas turbine engine comprising a gearbox, the gearbox having at least one gear, a journal bearing assembly rotatably supporting said gear, the journal bearing assembly having at least a pin, and a journal having a tubular body defining a pin-receiving inner cavity having an inner surface and receiving the pin therein, a first cavity and a second cavity defined in the inner surface of the pin-receiving inner cavity, a rib support located between the first cavity and the second cavity, the rib support being aligned with a longitudinal center of the tubular body, with the first cavity and the second cavity on opposed axial sides of the rib support.

In another aspect, there is provided a journal bearing assembly comprising a pin, and a journal defining an inner cavity receiving the pin, a first cavity and a second cavity defined in an inner surface of the pin-receiving cavity, a central support located between the first cavity and the second cavity and contacting said pin, the central support being aligned with a longitudinal center of the journal.

In a further aspect, there is provided a method for supplying oil in a journal bearing assembly comprising: receiving oil in a first cavity and a second cavity between a journal and a pin, abutting an axially-centered inner surface of the journal against the pin between the first cavity and the second cavity, and directing the oil from the first cavity and/or the second cavity to a recess between the journal and a part rotating on the journal.

BRIEF DESCRIPTION OF THE DRAWINGS

Reference is now made to the accompanying figures in which:

FIG. 1 is a schematic cross-sectional view of a gas turbine engine with a bearing journal assembly of the present disclosure;

FIG. 2 is a partial perspective view, partly cutaway, of a gear assembly as used in the engine of FIG. 1 and showing a journal bearing assembly, according to an embodiment of the present disclosure;

FIG. 3 is a perspective longitudinal sectioned view of the journal of the journal bearing assembly such as one shown in FIG. 2;

FIG. 4 is a perspective view of an embodiment of journal of FIG. 3; and

FIG. 5 is a perspective view of another embodiment of the journal as used in FIG. 2, cut along an axial plane.

DETAILED DESCRIPTION

FIG. 1 illustrates a gas turbine engine 10 of a type preferably provided for use in subsonic flight and configured for driving a load 12, such as, but not limited to, a propeller or a helicopter rotor or rotorcraft rotor. Depending on the intended use, the engine 10 may be any suitable aircraft engine, and may be configured as a turboprop engine or a turboshaft engine. The gas turbine engine 10 generally comprises in serial flow communication a compressor section 14 for pressurizing the air, a combustor 16 in which the compressed air is mixed with fuel and ignited for generating an annular stream of hot combustion gases, and a turbine section 18 for extracting energy from the combustion gases. Also shown is a central longitudinal axis 11 of the engine 10. Even though the present description specifically refer to a turboprop engine as an example, it is understood that aspects of the present disclosure may be equally applicable to other types of combustion engines in general, and other types of gas turbine engines in particular, including but not limited to turboshaft or turbofan engines, auxiliary power units (APU), and the like.

The gas turbine engine 10 also includes rotating parts or assemblies, such as gear assemblies 19 (e.g., epicycle reduction systems, planetary/reduction gearboxes (RGB), or other types of rotating assemblies) with rotating components mounted thereto using mounting devices allowing rotational and/or axial movement. In the embodiment shown, the gear assembly 19 is mounted at the front end of the engine 10, though it may be at other locations in the engine 10. An example of a gear assembly 19 as used in the engine 10 is shown in FIG. 2. In the depicted embodiment, the gear assembly 19 is part of an epicycle reduction system, also known as epicyclic gear train, epicyclic gearbox, planetary gearbox, etc., including one or more mounting devices, which is in FIG. 2 a journal bearing assembly 20 having a journal 40, also referred to as a journal shaft. The journal bearing assembly 20 may be used for interfacing a rotating part 19A to a structure 19B. The journal bearing assembly 20 may include one or more of a pin 30, a journal or shaft 40 and a sleeve 50.

In the example shown, the rotating part 19A is a gear, such as a planet. The gear may be an epicycle gear of epicycle reduction system, mounted on the journal bearing assembly 20 which is supported at both ends between two axially spaced supports 19C forming at least part of the structure 19B of the epicycle gear system, the structure 19B being for instance a carrier. In an embodiment, there are more than one of the planets 19A on the carrier 19B (e.g., three planets 19A). The supports 19C may be annular blocks supporting the pin 30 at its opposed ends.

Although not shown, other types of bearings may be used, such as roller bearings, ball bearings or any other suitable types of bearings. The journal bearing assembly 20 may or may not include the sleeve 50 disposed radially outwardly to the journal 40 relative to a longitudinal axis A of the journal bearing assembly 20. Such sleeve 50 may be used to form an outer peripheral surface of the journal bearing assembly 20. Otherwise, the outer periphery/surface of the journal 40 may contact directly the rotating part 19A it supports.

Referring to FIG. 2, the pin 30 is shown as being hollow, via inner cavity 31. The pin 30 may have a closed end with flange 32. The flange 32 may be used for one of the supports 19C to be lodged between the pin 30 and the journal 40. Another end of the pin 30 may be open to provide an access to the inner cavity 31, and/or as a result of fabrication or manufacturing. The pin 30 may be capped or plugged, for instance by bolt 33A and washer 33B. The washer 33B may not be present, and may be for example a cup washer as shown, a flat ring, etc. The bolt 33A or like fastener may sealingly close the inner cavity 31. The inner cavity 31 may consequently have inner threads for the screwing engagement of the bolt 33A thereto. In another embodiment, a plug may be force fitted inside the inner cavity 31. The bolt 33A and/or washer 33B or equivalent may be used for the other one of the supports 19C to be lodged between the pin 30 and the journal 40, whereby the pin 30 and the journal 40 are held captive between the supports 19C.

The pin 30 may have an inlet oil passage(s) 35. The inlet oil passage 35 may be in proximity to and/or radially aligned with one of the supports 19C to get an oil support from the support 19C. In an embodiment, the inner cavity 31 serves as an oil reservoir receiving the oil feed from the inlet oil passage 35. The pin 30 may also have one or more outlet oil passage(s) 36 (shown as 36A and 36B in the figures, but referred concurrently as 36 herein). The outlet oil passages 36 may be more centrally located. In an embodiment, a longitudinal axis of the outlet oil passages 36 is radially oriented relative to the pin 30, but other orientations are contemplated as well. In another embodiment, the outlet oil passages 36 may be symmetrically located relative to plane Q. A vector of the axis of rotation A is normal to the plane Q. The plane Q is a mid-plane of the journal bearing assembly 20.

Referring to FIG. 3, an embodiment of the journal 40 of the journal bearing assembly 20 such as one shown in FIG. 2, is illustrated in isolation. The journal 40 may be a monolithic piece. The journal 40 extends along the longitudinal axis A, which longitudinal axis A is the rotation axis of the rotating part 19A. The journal 40 has a pin-receiving inner cavity 41 (a.k.a., throughhole) extending along the longitudinal axis A and defining a pin-engaging surface. Stated differently, the journal 40 is tubular, with a maximum outer diameter D. The pin-receiving cavity 41 may thus receive the pin 30 of the gear assembly 19 when mounted within such assembly 19.

Depending on the configuration, the journal bearing assembly 20 may have its journal 40 fixed to the pin 30, such that the sleeve 50 (if present) or the rotating part 19A rotates about the pin 30 and the journal 40. If present, the sleeve 50 concurrently rotates with the rotating part 19A fixed thereon. In another embodiment, the journal bearing assembly 20 may have its journal 40 rotatably engaged with the rotating part 19A it supports, such that the journal 40 may be rotatably fixed relative to the pin 30 and may have the rotating part 19A mounted thereto rotatable relative to the journal 40, for instance with the sleeve 50 fixed to the rotating part 19A or to the journal 40.

The journal 40 has opposite axial end faces 42A, 42B. The journal 40 has a length L defined between the opposite axial end faces 42A, 42B. The axial end faces 42A, 42B may abut against the supports 19C as shown in FIG. 2. In the embodiment shown, the axial end faces 42A, 42B are flat surfaces. The axial end faces 42A, 42B may have bulges or non-flat surface features in other embodiments. Still referring to FIGS. 2 and 3, undercuts 43A and/or 43B are located in the journal 40, i.e., at one or both of the axial end faces. There may have only undercut 43A at one axial end face 42A, and not undercut 43B at the opposite axial end face 42B in some embodiments, or vice versa. The undercuts 43A, 43B are configured for allowing radial compliance or flexibility to the journal bearing assembly 20. Each of the two undercuts 43A, 43B is located at a respective one of journal first and second axial end faces 42A, 42B. Each of the two undercuts 43A, 43B defines an annular channel circumferentially extending around the longitudinal axis A. If present, the first undercut 43A projects from the first axial end face 42A toward the second axial end face 42B. If present, the second undercut 43B projects from the second axial end face 42B toward the first axial end face 42A.

The journal 40 may thus have cantilever sections S1, S2 which extend axially toward the end faces 42A, 42B from a merged zone located axially in between them. In other words, the journal bearing assembly 20 comprises a tubular body, which forms the journal 40, with concentric tubular subsections extending axially from the opposite axial end faces 42A and/or 42B toward a main central portion defined by the merged zone of the tubular body, and respective annular channels, i.e., the undercuts 43A, 43B, are defined between these concentric tubular sections on opposed ends of the tubular body. The outwardmost tubular subsections include respective cantilever sections S1, S2, as discussed above. The cantilever sections S1, S2 may thus allow the journal 40 to be compliant and deflect upon receiving journal bearing loads. As shown, the concentric tubular sections at one end face 42A, 42B may merge toward the central portion to form the corpus of the tubular body.

In the depicted embodiment, the two undercuts 43A, 43B are symmetrical relative to one another about the plane Q disposed axially at equal distance from the two axial end faces 42A, 42B. However, the two undercuts 43A, 43B may not be symmetrical relative to one another, or there may be only undercut 43A at one end face 42A and no undercut 43B at the other end face 42B.

A lubricating fluid film, such as an oil film, may be received between rotating components of the journal bearing assembly 20 to facilitate rotation of said components relative to one another. The outer surface of the journal 40 may define an outer recess 44 to receive and host the oil film for the sleeve 50 to rotate relative to the outer surface of the journal 40. The recess 44 may have a frusto-circular geometry as in FIG. 4, such as defined by a flat plane in the outer annular surface of the journal 40. Other geometries are considered, such as annular. In an embodiment in which the recess 44 is not annular, the recess 44 is located on a top half of the journal 40 for oil to be assisted by gravity to fill a play between the journal 40 and the sleeve 50. In another embodiment, a recess equivalent to the recess 44 may be located in the inner surface of the sleeve 50 instead of in the outer surface of the journal 44. In an embodiment, a length of the recess 44 extends to the undercuts 43.

Oil passages 45A and 45B (referred to concurrently as 45) extend through the body of the journal 40, from a surface of the recess 44 to inner cavities 46A, 46B (referred concurrently as 46), respectively. In an embodiment, the inner cavities 46 are annular grooves formed in a surface of the pin-receiving inner cavity 41, but other shapes are contemplated that are not necessarily annular. The inner annular cavities 46 may be separated by a central portion 47, i.e., the cavities 46 are on axially opposite sides of the central portion 47. The central portion 47 may be referred to as a central rib, a support, a bridge. The central portion 47 is said to be central as it is aligned with the plane Q, i.e., it is aligned with the longitudinal center of the journal 40. In an embodiment, the central portion 47 forms a continuous annular surface having a diameter d generally equal to that of a remainder of the surface of the pin-receiving inner cavity 41—excluding the inner annular cavities 46. The central portion 47 may optionally define one or more passages through it for oil to flow between the inner annular cavities 46. In an embodiment, there is a single oil passage 45 for the pair of inner annular cavities 46, with the inner annular cavities 46 fluidly communicating, e.g., via passages in the central portion 47 for oil to flow between the inner annular cavities 46. In an embodiment, the central portion 47 may be in the form of a plurality of circumferentially distributed pads or islands concurrently having the diameter d. In an embodiment, the journal is plane Q is a plane of symmetry for the journal 40.

As observed in FIG. 2, the inner annular cavities 46 are aligned with the outlet oil passages 36, such that the inner annular cavities 46A and 46B respectively receive the oil feed from the outlet oil passages 36A and 36B. Accordingly, in an embodiment, the flow path for lubricating oil is as follows. The oil is supplied to the journal bearing assembly 20 via the support(s) 19C and enters the inner cavity 31 of the pin 30. For example, the oil supply enters via the inlet oil passage(s) 35. The oil may therefore accumulate in the inner cavity 31. Oil may then pass through the outlet oil passages 36 to accumulate in the inner annular cavities 46. In an embodiment, the outlet oil passages 36 are in a lower half of the pin 30 to flow by gravity to the inner annular cavities 46. The inner annular cavities 46 may then act as a second reservoir for the oil. The oil may then reach the oil receiving cavity defined concurrently by the inner surface of the sleeve 50 and the recess 44, via the oil passage(s) 45. Stated differently, the planet gears 19A rotate via the journal bearing assembly 20—it may be pumped. The oil is brought through the carrier 19B and its supports 19C into the pin 30. The oil goes out the pin 30 through the shaft 40 and creates an oil film between the shaft 40 and the gear sleeve 50. This oil film becomes the rolling element for the gear 19A. Stated differently, the journal bearing assembly 20 may operate a method for supplying oil in which it receives oil in a first cavity and a second cavity between a journal and a pin, abuts an axially-centered inner surface of the journal against the pin between the first cavity and the second cavity, and directs the oil from the first cavity and/or the second cavity to a recess between the journal and a part rotating on the journal. The journal bearing assembly 20 may receive the oil from a reservoir in the pin and may direct the oil from the first cavity and from the second cavity through separate oil passages.

By way of the pair of inner annular cavities 46, the journal 40 has a dual cavity arrangement with centered reinforcing rib or central portion 47 for the oil reservoir made of the combined inner annular cavities 46. The radial play between the shaft 40 and the pin 30 is for even oil pressure in the two inner annular cavities 46 of the shaft 40. The central portion 47 creates a more even pressure distribution in operation in support to the shaft wings, i.e., the parts of the shaft 40 in contact with the pin 30 axially outward of the inner annular cavities 46 from the central plane Q. Consequently, the addition of central support, in the form of the central portion 47, may reduce a pressure pattern dip toward the center of the shaft 40 in comparison to an arrangement with one central inner annular cavity.

The inner cavity 31 and the inner annular cavities 46 provide the journal bearing assembly 20 with a double oil reservoir configuration, the first reservoir being the inner cavity 31 in the pin 30 and the second reservoir being the inner annular cavities 46 in the shaft 40. This may cause a stability in the oil pressure, for instance in the form of a lessened fluctuation in case of oil starvation. This double reservoir may also have an oil feed direction from the pin 30 to the shaft 40 and from the shaft 40 to the oil receiving recess 44 between the shaft 40 and the sleeve 50, for instance to reduce oil fluctuation and cavitation. According to an embodiment, the double outlet oil feed on the pin 30, in the form of the outlet oil passages 36 assists in suitably feeding the inner annular cavities 46. Moreover, the double outlet oil feed from the shaft 40, via the oil passages 45, may improve oil distribution between the shaft 40 and the sleeve 50 to reduce the risk of dry spots.

Alternate designs are considered for the geometry of the central rib 47. For example, FIG. 3 shows a trapezoid cross-section for the central rib 47, but other cross-sectional shapes such as rectangular, square, frusto-circular, triangular, etc. Moreover, The angular and/or offset positions and the number of oil feeds form the pin and the as shown in FIG. 4, there may be more than two oil passages 45 to feed the recess 44 with oil. As shown in FIG. 5, the oil passages 45 may be radially oriented, but may also be offset and non-radial.

Consequently, the presence of the central support 47 enhances the stiffness of the journal 40. The lack of stiffness of a journal may be constraint to the length of the journal. The presence of the central support 47 may allow the journal 40 to have a L/D ratio from 1.50 to 3.00.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A gas turbine engine comprising a gearbox, the gearbox having at least one gear, a journal bearing assembly rotatably supporting said gear, the journal bearing assembly having at least a pin, and a journal having a tubular body defining a pin-receiving inner cavity having an inner surface and receiving the pin therein, a first cavity and a second cavity defined in the inner surface of the pin-receiving inner cavity, a rib support located between the first cavity and the second cavity, the rib support being aligned with a longitudinal center of the tubular body, with the first cavity and the second cavity on opposed axial sides of the rib support, the pin-receiving inner cavity defining a pin-engaging surface contacting the pin at the rib support and between axial end faces and the first cavity and the second cavity.

2. The gas turbine engine according to claim 1, wherein a recess is defined in an outer annular surface of the tubular body, a first oil passage extending from the first cavity to the recess.

3. The gas turbine engine according to claim 2, wherein a second oil passage extends from the second cavity to the recess.

4. The gas turbine engine according to claim 2, wherein the recess has a plane on the outer annular surface.

5. The gas turbine engine according to claim 1, wherein an undercut is defined circumferentially in a first and/or a second one of the axial end faces of the tubular body.

6. The gas turbine engine according to claim 1, wherein the first cavity and the second cavity are annular.

7. The gas turbine engine according to claim 1, wherein a length to diameter ratio of the tubular body is from between 1.50 and 3.00 inclusively.

8. The journal according to claim 1, wherein the journal has a plane of symmetry passing through the longitudinal center and transverse to a longitudinal axis of the tubular body.

9. A journal bearing assembly comprising
a pin, and
a journal defining an inner cavity receiving the pin, a first cavity and a second cavity defined in an inner surface of the pin-receiving cavity, a central support located between the first cavity and the second cavity and contacting said pin, the central support being aligned with a longitudinal center of the journal, the pin-receiving inner cavity defining a pin-engaging surface contacting the pin at the central support and between axial end faces and the first cavity and the second cavity;
wherein the pin defines an inner oil reservoir, a first outlet oil passage extending from the oil reservoir to the first cavity.

10. The journal bearing assembly according to claim 9, wherein a second outlet oil passage extends from the oil reservoir to the second cavity.

11. The journal bearing assembly according to claim 10, further comprising a sleeve rotatably mounted onto the journal, and a recess is defined between an outer annular surface of the journal and an inner surface of the sleeve, a first oil passage extending from the first cavity to the recess and a second oil passage extending from the second cavity to the recess.

12. The journal bearing assembly according to claim 11, wherein the recess is defined in the outer annular surface of the journal.

13. The journal bearing assembly according to claim 9, wherein the first cavity and the second cavity are annular.

14. The journal bearing assembly according to claim 9, wherein a length to diameter ratio of the tubular body is from between 1.50 and 3.00 inclusively.

15. The journal bearing assembly according to claim 9, wherein the journal has a plane of symmetry passing through the longitudinal center and transverse to a longitudinal axis of the tubular body.

16. A journal bearing assembly comprising
a pin, and
a journal defining an inner cavity receiving the pin, a first cavity and a second cavity defined in an inner surface of the pin-receiving cavity, a central support located between the first cavity and the second cavity and contacting said pin, the central support being aligned with a longitudinal center of the journal, the pin-receiving inner cavity defining a pin-engaging surface contacting the pin at the central support and between axial end faces and the first cavity and the second cavity;
wherein the first cavity and the second cavity are annular.

17. The journal bearing assembly according to claim 16, wherein a length to diameter ratio of the tubular body is from between 1.50 and 3.00 inclusively.

18. The journal bearing assembly according to claim 16, wherein the journal has a plane of symmetry passing through the longitudinal center and transverse to a longitudinal axis of the tubular body.

* * * * *